(12) United States Patent
Urano et al.

(10) Patent No.: US 8,138,640 B2
(45) Date of Patent: Mar. 20, 2012

(54) ROTATING ELECTRIC MACHINE AND COOLING SYSTEM FOR THE ROTATING ELECTRIC MACHINE

(75) Inventors: Hiroaki Urano, Aichi-ken (JP); Eiji Yamada, Owariasahi (JP); Kazutaka Tatematsu, Nagoya (JP); Yasuji Taketsuna, Okazaki (JP); Atomi Arakawa, Anjo (JP); Akihiro Tanaka, Nishio (JP); Sadahisa Onimaru, Chiryu (JP); Hirohito Matsui, Okazaki (JP); Ryotaro Okamoto, Nishio (JP)

(73) Assignees: Toyota Jidosha Kabushiki Kaisha, Toyota-Shi (JP); Nippon Soken, Inc., Nishio-Shi (JP)

( * ) Notice: Subject to any disclaimer, the term of this patent is extended or adjusted under 35 U.S.C. 154(b) by 202 days.

(21) Appl. No.: 12/539,856

(22) Filed: Aug. 12, 2009

(65) Prior Publication Data

US 2010/0038981 A1  Feb. 18, 2010

(30) Foreign Application Priority Data

Aug. 12, 2008  (JP) .................. 2008-207803

(51) Int. Cl.
 *H02K 9/00* (2006.01)
(52) U.S. Cl. ............... 310/43; 310/260; 310/54; 310/64
(58) Field of Classification Search .............. 310/43, 310/260, 52, 54, 57, 64
See application file for complete search history.

(56) References Cited

U.S. PATENT DOCUMENTS

| | | | | |
|---|---|---|---|---|
| 4,959,570 | A * | 9/1990 | Nakamura et al. | 310/54 |
| 5,532,533 | A * | 7/1996 | Mizutani | 310/68 B |
| 6,081,056 | A * | 6/2000 | Takagi et al. | 310/89 |
| 6,160,332 | A * | 12/2000 | Tsuruhara | 310/54 |
| 6,169,344 | B1 * | 1/2001 | Tsuruhara | 310/58 |
| 6,441,518 | B1 * | 8/2002 | Yockey et al. | 310/58 |
| 6,573,622 | B2 * | 6/2003 | Lim et al. | 310/12.21 |
| 6,756,005 | B2 * | 6/2004 | Panek et al. | 264/255 |
| 6,998,740 | B2 | 2/2006 | Matsuki | |
| 2009/0302695 | A1 | 12/2009 | Kawamura et al. | |

FOREIGN PATENT DOCUMENTS

| | | |
|---|---|---|
| JP | 5457302 | 4/1979 |
| JP | 56115154 A | 9/1981 |
| JP | 56115154 A | 9/1981 |
| JP | 2000228843 A | 8/2000 |
| JP | 2000228843 A | 8/2000 |

(Continued)

OTHER PUBLICATIONS

Japanese Office Action for Application No. JP 2008-207803 mailed Sep. 28, 2010.

*Primary Examiner* — Dang D Le
(74) *Attorney, Agent, or Firm* — Gifford, Krass, Sprinkle, Anderson & Citkowski, P.C.

(57) ABSTRACT

Heat discharging property of the stator coil end is improved effectively in a rotating electric machine. A motor as the rotating electric machine includes a stator and a rotor. The stator includes a stator core and resin mold coil ends provided on both axial ends thereof. Column-shaped projections projecting in the axial direction are provided on axial side surfaces of resin mold coil ends at a plurality of positions. Cooling oil supplied from above the resin mold coil ends effectively cools the resin mold coil ends.

4 Claims, 9 Drawing Sheets

FOREIGN PATENT DOCUMENTS

| | | |
|---|---|---|
| JP | 2001028858 A | 1/2001 |
| JP | 2004357458 A | 12/2004 |
| JP | 2005073351 A | 3/2005 |
| JP | 2005073351 A | 3/2005 |
| JP | 2005168268 A | 6/2005 |
| JP | 2005354821 A | 12/2005 |
| JP | 2005354821 A | 12/2005 |
| JP | 2006311750 A | 11/2006 |
| JP | 2006311750 A | 11/2006 |
| JP | 2007082366 A | 3/2007 |
| JP | 2007082366 A | 3/2007 |
| JP | 2007336677 A | 12/2007 |
| WO | WO-2004019468 A1 | 3/2004 |

* cited by examiner

ROTATING ELECTRIC MACHINE AND COOLING SYSTEM FOR THE ROTATING ELECTRIC MACHINE

RELATED APPLICATIONS

This application claims priority to Japanese Patent Application No. 2008-207803, filed on Aug. 12, 2008, the entire content of which is incorporated herein by reference.

BACKGROUND ART

The present invention relates to a rotating electric machine having a rotor and a stator opposing the rotor and having a stator coil end, and a cooling system for the rotating electric machine.

A rotating electric machine for a vehicle motor or the like known conventionally in the related art includes a stator and a rotor. As the stator which constitutes the rotating electric machine, a stator as shown in FIG. 8 is conceived in the related art. FIG. 8 is a schematic perspective view of a first example of the stator which is conceived in the related art. A stator 10 shown in FIG. 8 includes teeth 14 projecting in the radial direction on an inner peripheral surface of a stator core 12, which is configured with a laminated steel plate or the like, at a plurality of positions in the circumferential direction, and coils 16 are wound around the teeth 14 in the concentrated winding manner. Coil end bodies 18 which are coil portions projecting in the axial direction from axial both end surfaces of the stator core 12 and constitute stator coil ends are designed to be stiffened by being dipped in or painted with varnish. The coil end bodies 18 are stiffened in order to secure insulating properties between the coils 16 in respective phases, and to provide sufficient mechanical strength to the coil end bodies 18.

Mounting portions 20 for fixing the stator 10 in a motor case (not shown) are provided on an outer peripheral surface of the stator core 12 at a plurality of positions in the circumferential direction. Although it is not shown in the drawing, lead wires connected to the each coil 16 are drawn from part of the coil end body 18, so that the lead wires are connectable to an inverter (not shown) or the like as an outer circuit. Although in the configuration shown in FIG. 8 the each coil 16 is wound around the teeth 14 in the concentrated winding manner, winding the coil 16 so as to straddle a plurality of the teeth 14, in so called "distributed winding manner" may also be employed.

FIG. 9 is a schematic perspective view of a second example of the stator conceived in the related art. FIG. 10 is a side view of the stator shown in FIG. 9, while FIG. 11 shows the right side of the stator of FIG. 10. A stator 22 shown in FIGS. 9 to 11 is configured in such a manner that a pair of the coil end bodies 18 (see FIG. 8) projecting in the axial direction from both axial end surfaces of the stator core 12 at axial end portions of the coils 16 (see FIG. 8) wound around the teeth 14 (see FIG. 8) are embedded in resin, that is, resin molded, so that a pair of resin mold coil ends 24, which are a pair of the stator coil ends, are formed. Employing the resin mold coil ends 24 as the stator coil ends makes it possible to reduce the cost of manufacturing the rotating electric machines and to improve the overall heat discharge properties of the coil end bodies 18 when the stator coil ends are cooled using oil or the like. In this example, the configuration is otherwise the same as that of the first example of the stator shown in FIG. 8 described above.

The rotating electric machine including the stator 22 as described above is cooled in the following manner. FIG. 12 is a schematic diagram showing an example of a cooling system 26 for the rotating electric machine according to a related art, and includes the stator 22 shown in FIGS. 9 to 11. The cooling system 26 includes a motor 28 as the rotating electric machine and an oil circulation path 30. The motor 28 includes the stator 22 fixed to an inner side of a cylindrical housing 32 and a rotor 34. A pair of metallic covers 36 are fixed to axial both end portions of the metallic housing 32. Each of the covers 36 includes a hole portion 38 at a center portion thereof, and is provided with a bearing 40 in the hole portion 38. It is also possible to additionally provide inside each hole portion 38 with a sealing member for preventing cooling oil from leaking from the interior of the cover 36. The rotor 34 is radially opposed to an inner peripheral side of the stator 22 in a state of being fixed to an outer peripheral side of a mid portion of a rotary shaft 42. The rotary shaft 42 is supported by the bearings 40 so as to be rotatable with respect to the covers 36. The pair of covers 36 and the housing 32 constitute a motor case 44.

The motor case 44 is provided with a cooling oil supply port 46 and a cooling oil discharge port 48. The cooling oil supply port 46 and the cooling oil discharge port 48 are connected to the oil circulation path 30, which is further provided with an oil pump 50. The cooling oil discharged from the oil pump 50 is supplied from the cooling oil supply port 46 into the motor case 44, in which it flows downward in the direction of gravity. The cooling oil flows downward through a gap between an inner surface of the motor case 44 and the resin mold coil end 24 and is fed from the cooling oil discharge port 48 to the oil circulation path 30 and is accumulated in an oil pan 52, from which it is drawn into the oil circulation path 30 by the oil pump 50. In such a rotating electric machine cooling system 26, even when the coils 16 (see FIG. 8) which constitute the motor generate heat during operation, the generated heat may be transferred from the coil end bodies 18 (see FIG. 8) to the motor case 44 via the cooling oil, so that the motor 28 can be cooled.

Also, Japanese Patent Publication JP-A-2000-228843 discloses a motor having a stator formed integrally with a housing, a rotor being formed integrally with a rotary shaft, and brackets configured to support the rotary shaft and arranged at both ends in a motor axis direction, in which rib-shaped projections are provided in the radial direction at positions inside the brackets corresponding to gaps formed between adjacent coil ends. This publication describes that, in a motor according to the disclosed configuration, heat discharging paths for transferring heat generated from the coil ends to the brackets via the projections are secured, so that heat discharging properties are enhanced.

Additionally, Japanese Patent Publication JP-A-2005-73351 discloses a rotating electric machine configured in such a manner that a hollow portion in a inner hollow shaft constituting a rotary shaft is connected to an oil pump, cooling oil is supplied to the hollow portion and sprayed inside the housing via openings formed on a outer hollow shaft which is disposed outside the inner hollow shaft and constitutes the rotary shaft whit the inner hollow shaft, and a cooling oil holding member is provided in the housing. The cooling oil holding member employed in that configuration has a recessed shape opening in the direction toward the rotary shaft so as to surround a stator coil end on an outer peripheral side thereof. This publication describes that this configuration enables the cooling oil holding member to sufficiently cool the stator coil end, the stator coil, and the stator with the cooling oil.

Japanese Patent Publication JP-A-2005-354821 discloses a motor configured in such a manner that a winding migrating portion of stator winding is coated with a molded resin, an annular-shaped notched portion is formed in the vicinity of a connecting portion with respect to an end surface of a stator on an outer peripheral surface of the resin molded portion, a coolant flow channel which surrounds the periphery by the notched portion, an end surface of the stator in a motor axis direction and an inner peripheral surface of a housing is defined, and coolant circulated in the coolant flow channel is discharged out from a coolant discharging hole penetrated through the resin molded portion.

Furthermore, Japanese Patent Publication JP-A1-2004/19468 discloses a motor in which both end surfaces of a coil and a stator core of a stator unit are covered by a coil end cover having a square C-shape, the coil end cover being formed with a cooling oil inlet port on a lower portion thereof and a cooling oil discharge port on an upper portion thereof. This publication describes that a gap between a slot sealing member which fixes the coil in a slot and the coil is used as an oil channel, such that oil is discharged from the cooling oil discharge port when an oil level of the cooling oil supplied from the cooling oil inlet port into the coil end cover and the oil channel rises and the cooling oil is supplied to an extent which fills the entire coil of the stator unit.

The cooling property of the stator coil end in the cooling system 26 for the rotating electric machine shown in FIG. 12 as described above requires further improvement. First, when configuring the stator coil end with the resin mold coil end 24, if the resin mold coil end 24 is formed by resin die forming, normally, the surface of the resin mold coil end 24 will be formed without pits and projections, and may therefore be too smooth. Therefore, there is a need for improvement to increase the surface area of the stator coil end side sufficiently to enable efficient exchange of heat between the stator coil end and the motor case 44, and also a possibility of improving the heat discharging property of the stator coil end. With such configuration, it is also possible that the cooling oil flowing on the surface of the resin mold coil end 24 may flow so quickly that, even though the cooling oil is supplied to the stator 22, heat is not effectively transferred to the cooling oil, and the cooling oil flowing over the surface of the resin may therefore not sufficiently cool the heated coils 16 (see FIG. 8) in the interior of the resin. Therefore, improvement of the heat discharging property of the stator coil end is also desirable.

When no device is made to the structure of an inner surface of the cover 36 opposing the resin mold coil end 24, the inner surface of the cover 36 may be formed as smooth, slippery surface of a high density material. Therefore, it is desirable to increase the surface area on the inner surface side of the cover 36, and also possible to further improve the heat discharging property of the stator coil end. Also, the cooling oil flowing over the inner surface of the cover 36 also tends to flow too quickly, and hence, even when the cooling oil which comes into contact with the stator coil end flows over the inner surface of the cover 36, sufficient heat may not be transferred from the cooling oil to the motor case 44, and the temperature of the coils 16 (see FIG. 8) may not be lowered sufficiently. From this point as well, there is need for improvement of the heat discharging property of the stator coil end. That is, there is an unmet need for improvement not only when the stator coil end is the resin mold coil end, but also when the coil end body 18 (see FIG. 8) is solidified using varnish or the like.

Improving the heat discharging property of the stator coil end by upsizing the rotating electric machine or by excessively increasing components of the rotating electric machine has been contemplated. However, with either of these approaches, undesirable increase in either or both of the weight of the rotating electric machine or the cost of manufacture of the rotating electric machine is brought.

In contrast, in the case of the motor disclosed in JP-A-2000-228843 described above, although the ribs are provided on the inner surface of the bracket opposed to the coil end, the portion between the adjacent ribs on the bracket may include the smooth, slippery surfaces and, in addition, the coil end is not resin-molded. Further, fixing separate ribs to the bracket undesirably increases the cost of manufacturing the motor. Therefore, improvement of the heat discharging property of the stator coil end is still desirable.

In the case of the rotating electric machine disclosed in JP-A-2005-73351 described above, because the cooling oil holding member used only for cooling the rotating electric machine is provided in the housing, the cost of manufacturing the rotating electric machine is undesirably increased. Therefore, improvement in terms of effective improvement of the heat discharging property of the stator coil end is further desired.

Also, in the case of the motor disclosed in JP-A-2005-354821 as described above, forming the notched portion for defining the coolant flow channel on the resin molded portion, and providing the coolant discharging hole penetrating through the resin molded portion both undesirably increase the manufacturing cost of the motor might be resulted. Therefore, improvement of the heat discharging property of the stator coil end is also desired in this respect.

In the case of the motor disclosed in JP-A1-2004/19468 as described above, providing the coil end cover which surrounds both end surfaces of the coil of the stator unit and the stator core undesirably increases the cost of manufacturing the motor. Improvement of the heat discharging property of the stator coil end is therefore also desired in this respect.

SUMMARY OF THE INVENTION

It is an object of the invention to improve the heat discharging property of a stator coil end in a rotating electric machine or in a cooling system thereof.

According to a first aspect, the present invention provides a rotating electric machine including a rotor and a stator having a stator coil end, the stator coil end allowing flow of a heat transfer medium over a surface thereof during operation, in which the stator coil end is a resin mold coil end including a coil end body formed of axial end portions of coils which constitute the stator and resin which covers the coil end body, and the resin mold coil end includes a plurality of projections provided on a surface thereof.

With this configuration, because, when the heat transfer medium flows over the surface of the stator coil end during operation, the plurality of projections allow the heat transfer medium to remain on the surface of the stator coil longer, the contact time between the heat transfer medium and the stator coil end is increased, while it is ensured that the heat transfer medium flows over the entire surface of the stator coil end. Additionally, the heat exchange surface area for exchanging heat between the heat transfer medium and the stator coil end may be increased though the plurality of projections. Therefore, effective improvement of a heat discharging property of the stator coil end is achieved. In addition, by integrally forming the plurality of projections with the resin mold coil end when resin-molding the coil end body, effective improvement of the heat discharging property of the coil end body is achieved without excessively increasing costs.

In the first aspect of the rotating electric machine, the plurality of projections preferably project in the axial direction from an axial end surface of the resin mold coil end at a plurality of positions along the circumferential direction.

It is further preferable that, in the first aspect of the rotating electric machine, the plurality of projections project along the radial direction or in a direction inclined with respect to the radial direction from an outer peripheral surface of the resin mold coil end at a plurality of positions along the circumferential direction.

The plurality of projections each preferably have a shaft shape.

A rotating electric machine according to a second aspect of the invention is a rotating electric machine including a rotor; a stator having a stator coil end, the stator coil end allows flow of a heat transfer medium on a surface thereof during operation; a cover provided so as to oppose the stator coil end via a gap for allowing flow of the heat transfer medium, in which the cover includes a foamed portion provided on an inner surface opposing the stator coil end.

With this configuration, because the heat transfer medium flowing through the gap between the surface of the stator coil end and the inner surface of the cover during operation lingers on the surface of the cover, the contact time between the heat transfer medium and the cover is increased. Also, by bringing the stator coil end and the cover in proximity to each other, the heat transfer medium easily penetrates into the cover, whereby the contact time between the heat transfer medium and the cover is further increased. Further, increase of the substantial surface area of the inner surface of the cover is easily achieved, so that the heat exchange surface area between the heat transfer medium and the cover may be increased. Therefore, effective improvement of the heat discharging property of the stator coil end is achieved. Also, since the cover is configured as a portion of the motor case which covers the stator, there is no need to supply a specific component used only for cooling the rotating electric machine, and significant component cost can be avoided. Therefore, further effective improvement of the heat discharging property of the stator coil end is achieved.

In the second aspect of the rotating electric machine, a portion of the cover including at least the inner surface opposing the stator coil end is preferably formed of a foamed metal.

With such a configuration, the strength of the cover is effectively ensured.

It is further preferable that, in the second aspect of the rotating electric machine, the stator coil end is a resin mold coil end including a coil end body formed of axial end portions of coils which constitute the stator and resin which embeds the coil end body.

With this configuration, improvement of the heat discharging property of the entire stator coil end when cooling the stator coil end by flowing the heat transfer medium such as cooling oil is achieved.

A cooling system for a rotating electric machine according to the present invention includes a rotating electric machine according to the invention and a heat transfer medium supply portion configured to supply heat transfer medium to the rotating electric machine.

As described above, by employing the rotating electric machine and the cooling system for the rotating electric machine according to the present invention, effective improvement of the heat discharging properties of the stator coil end can be achieved.

BRIEF DESCRIPTION OF THE DRAWINGS

The present invention will be further described with reference to the accompanying drawings wherein corresponding reference numerals are used to refer to corresponding parts in the several views, and wherein.

DETAILED DESCRIPTION OF THE EMBODIMENTS

First Embodiment

Figure 1:
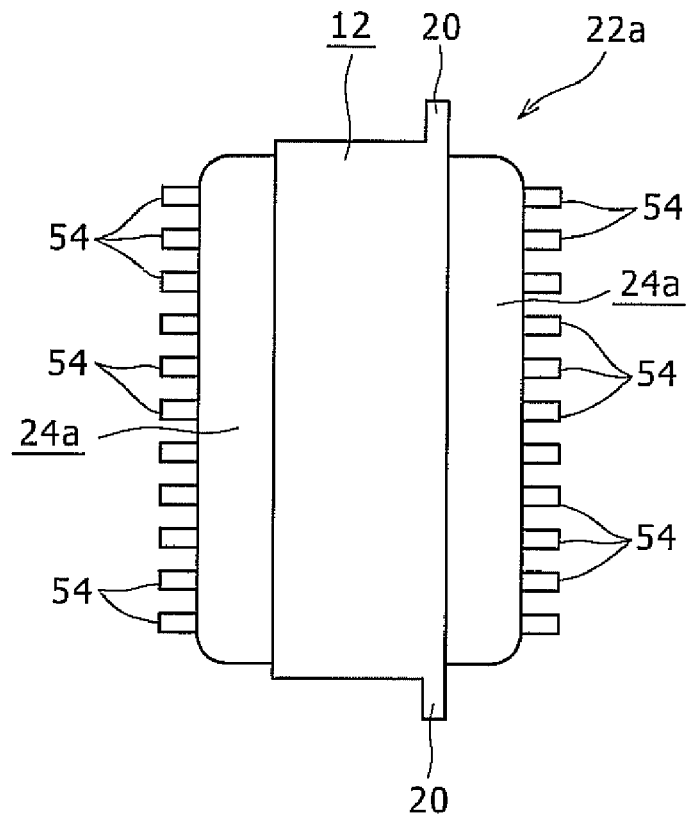
FIG. 1 is a schematic drawing showing a stator which constitutes a motor as a rotating electric machine according to a first embodiment of the present invention.
Figure 2:
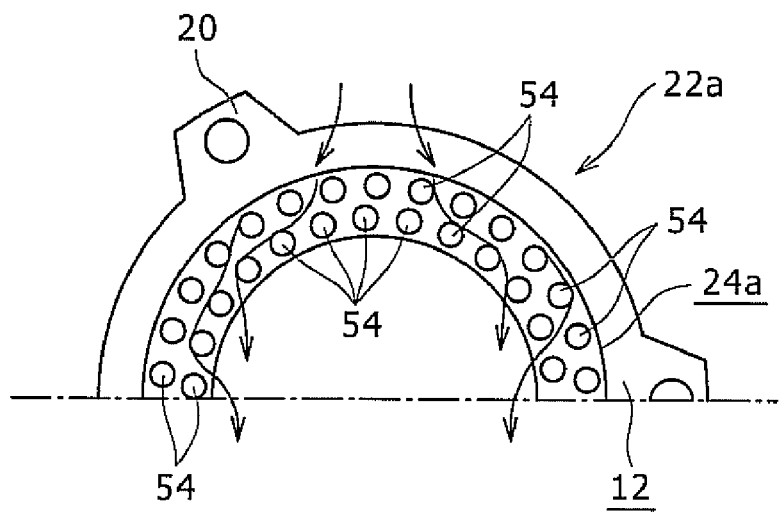
FIG. 2 is a drawing showing an upper half portion of the stator shown in FIG. 1 when viewed from the right side.
Figure 3:
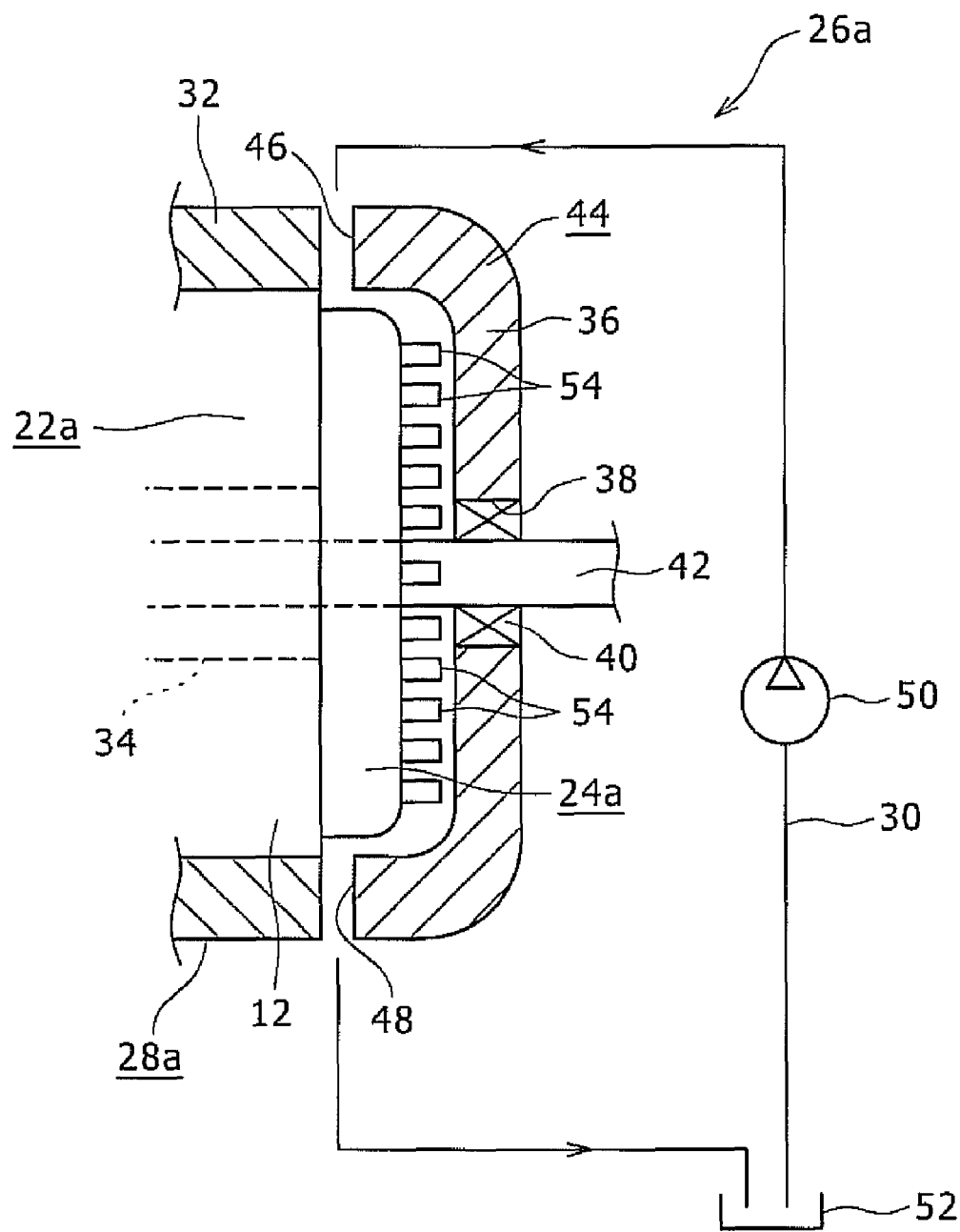
FIG. 3 is a schematic drawing showing a cooling system for the rotating electric machine according to the first embodiment.

A first embodiment of the present invention will be described with reference to FIGS. 1, 2, and 3. FIG. 1 is a schematic drawing showing a stator which constitutes a motor as a rotating electric machine according to the first embodiment. FIG. 2 is a drawing showing an upper half portion of the stator shown in FIG. 1 when viewed leftward from the right. FIG. 3 is a perspective view showing a cooling system for the rotating electric machine.

A motor 28a according to the first embodiment is used to drive, for example, a hybrid vehicle or to generate electricity, and includes a stator 22a shown in FIGS. 1 and 2 and a rotor 34 (see FIG. 3). The stator 22a includes a stator core 12 formed of a laminated steel plate or the like and a pair of resin mold coil ends 24a provided on axial both ends thereof. The stator core 12 is fixed inside a motor case 44 formed of a metal such as aluminum by die casting or the like as shown in FIG. 3. A rotary shaft 42 is disposed radially inside the stator 22a and the rotary shaft 42 is rotatably supported on the motor case 44. The rotor 34 fixed radially outside the midsection of the rotary shaft 42 and the stator 22a are opposed in the radial direction. The first embodiment is characterized primarily by the configuration of the stator 22a, and the configuration of the other components is otherwise the same as in the motor 28 and the cooling system 26 for the rotating electric machine 28 shown in FIGS. 9 to 12. As such, portions equivalent to those already described will designated by the same reference numerals and their description will be either simplified or not repeated.

Figure 8:
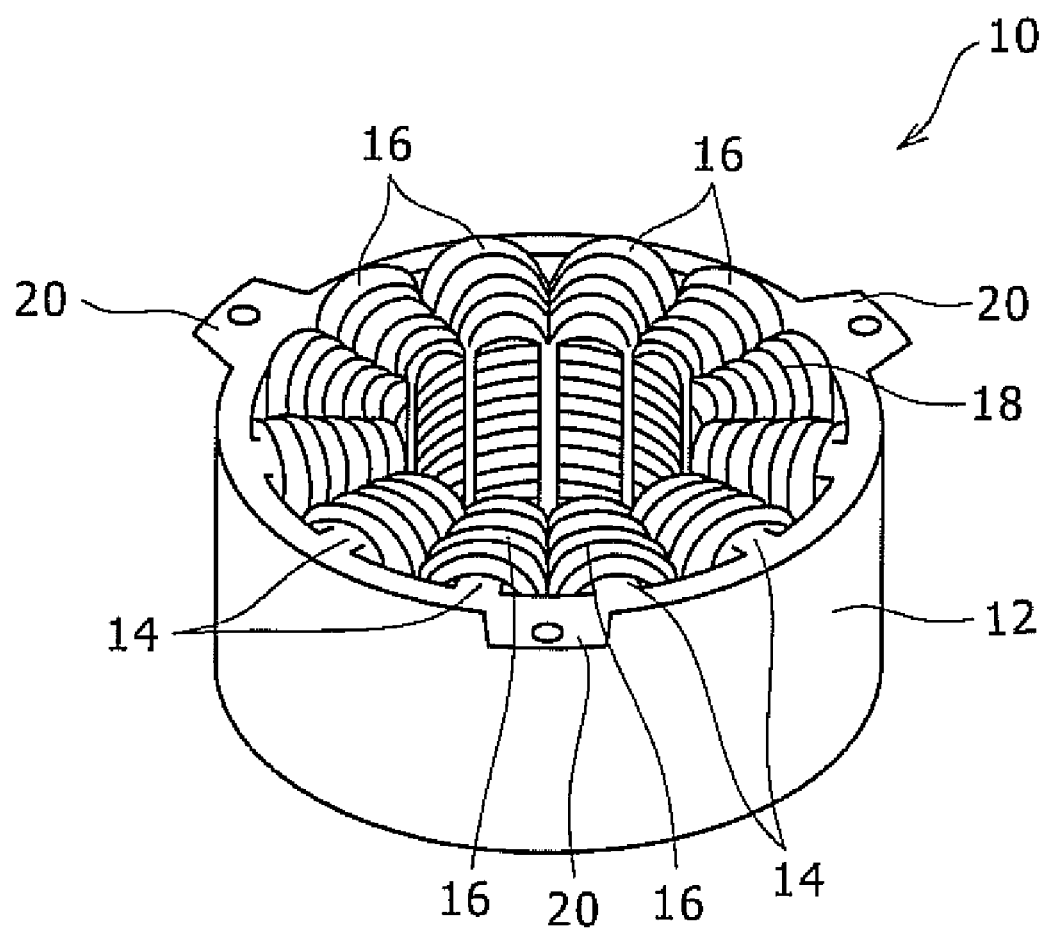
FIG. 8 is a schematic perspective view of a first example of a stator according to a related art.

The stator 22a includes the resin mold coil ends 24a as a pair of stator coil ends at both axial end portions of the stator core 12. The stator coil ends are formed by winding coils 16 (see FIG. 8) on teeth 14 (see FIG. 8) provided at a plurality of positions in the circumferential direction of the stator core 12 formed of laminated steel plates or the like at positions on the inner diameter sides. The resin coil ends 24a are formed by resin-molding a pair of coil end bodies 18 (see FIG. 8) projecting from axial both end surfaces of the stator core 12 toward the both axial sides. In other words, the resin mold coil ends 24a each include a coil end body 18 (see FIG. 8) formed of the axial end portions of the coils 16 (see FIG. 8) which constitute the stator 22a and the resin embedding the coil end body 18 therein. The resin embedding the coil end body 18 is an insulating resin having insulating properties, such as epoxy resin or BMC (bulk molding compound) or the like.

The resin mold coil ends 24a each include column-shaped projections 54 of a shaft shape formed on an axial outer side surface at a plurality of positions in the circumferential direction so as to project in the axial direction. In the example shown in the drawing, the column-shaped projections 54 are also provided at positions on the axial outer side surfaces of the resin mold coil ends 24a separated from each other along the radial axis.

As shown in FIG. 3, the cooling system 26a for the rotating electric machine in the first embodiment includes the motor 28a as the rotating electric machine as described above, an oil circulation path 30 which allows passage of cooling oil as a heat transfer medium, and an oil pump 50 provided on the oil circulation path 30. The oil pump 50 is a heat transfer medium supplying unit which supplies the cooling oil to the motor 28a.

As, other than the stator 22a, the configuration of the cooling system 26a is otherwise the same as the case of the cooling system 26 described above with referring to FIG. 12, corresponding components are designated by the same reference numerals and their description, if repeated, will b simplified. As the cooling oil, for example, oil used for lubrication of a gear shifter such as an automatic transmission fluid (ATF) may be used.

It is also possible to not provide the oil pump 50 in the cooling system 26a for the rotating electric machine and to instead cause the cooling oil to circulate in the oil circulation path 30 by the action of the rotating portions such as gears. It is still further possible to provide a heat exchanger which transfers heat from the cooling oil to the environment through a means other than by cooling the oil using the oil pan 52.

In the case of the cooling system 26a for the rotating electric machine as described above, the cooling oil discharged from the oil pump 50 and supplied from a cooling oil supply port 46 provided on an upper portion of the motor case 44 onto an upper portion of the resin mold coil end 24a flows downward over the surface of the resin mold coil end 24a and is returned to the oil circulation path 30 through a cooling oil discharge port 48. In this manner, the resin mold coil ends 24a are cooled by the cooling oil flowing downward over their surfaces.

It is also possible to cause a portion of the oil circulation path 30 to pass through a cooling portion (not shown), such as a water jacket for exchanging heat with cooling water or the like, so as to cool the cooling oil in the oil circulation path 30.

It is also possible to cause the cooling oil to circulate in the oil circulation path 30 and the motor case 44 by supplying the cooling oil into the motor case 44 from a lower side and feeding the same from an upper side to the oil circulation path 30 other than causing the cooling oil to flow downward in the motor case 44.

The motor case 44 which fixes the stator 22a may be integrated with a case which configures a reduction gear mechanism and/or a case which configures a differential gear mechanism, or a single case common to a gear mechanism. According to the rotating electric machine and the cooling system in this first embodiment having a configuration in which the resin mold coil ends 24a are constituted by resin-molding the coil end bodies 18 (see FIG. 8), the cooling performance of the motor 28a can be improved. In other words, because the column-shaped projections 54 of the shaft shape are provided at the plurality of positions in the circumferential direction on the axial side surfaces of the respective resin mold coil ends 24a, the cooling oil supplied to the upper portions of the resin mold coil ends 24a and flowing downward along the surfaces of the axial end surfaces of the resin mold coil ends 24a flows as shown by arrows in FIG. 2, for example. Therefore, the contact time in which the cooling oil comes into contact with the surfaces of the resin mold coil ends 24a can be increased. In other words, by causing turbulence in the flow of the cooling oil flowing downward along the surface of the resin mold coil ends 24a by means of the provided column-shaped projections 54, the cooling oil more readily lingers upon the surface. Consequently, the flow of the cooling oil down along the resin mold coil ends 24a is disturbed in such a manner that the cooling oil is able to more easily flow over a sufficiently large surface area of the end surfaces of the resin mold coil ends 24a. Also, because the cooling oil must flow through the gap between the column-shaped projections 54, the corresponding surface tension causes the cooling oil to flow more slowly. Therefore, the contact time between the cooling oil and the resin mold coil ends 24a may be increased, the heat exchange performance between the cooling oil and the resin mold coil ends 24a is improved, and, hence, the cooling performance of the motor 28a can be improved.

Figure 9:
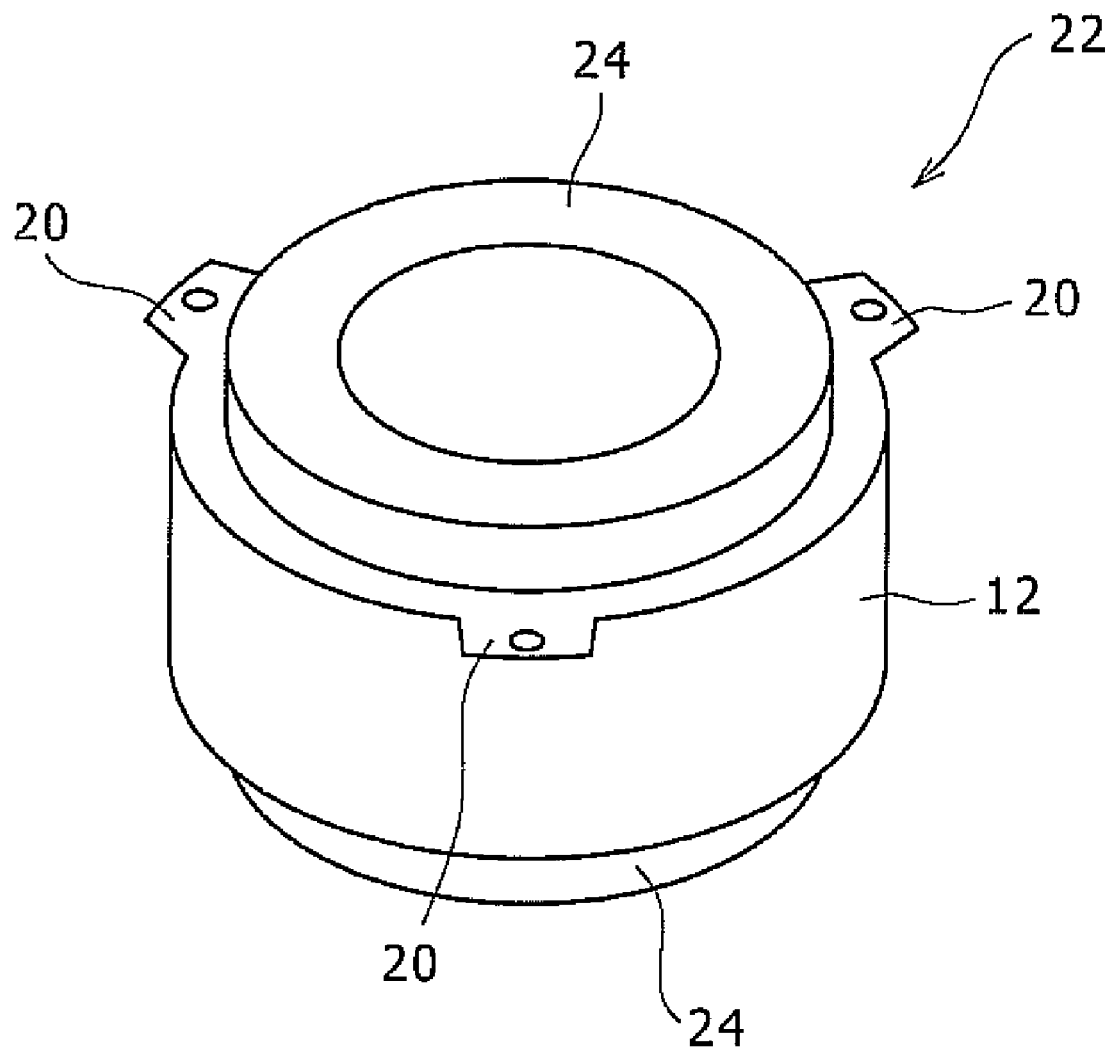
FIG. 9 is a schematic perspective view of a second example of a stator according to a related art.
Figure 10:
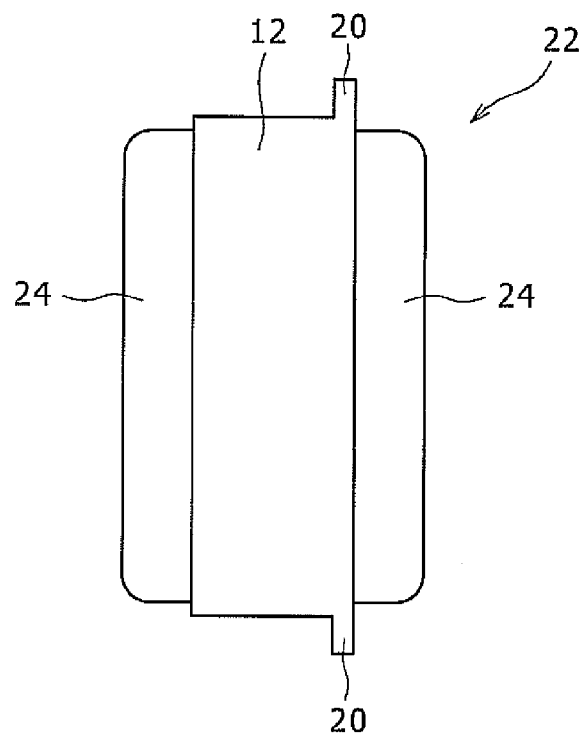
FIG. 10 is a side view of the stator shown in FIG. 9.
Figure 11:
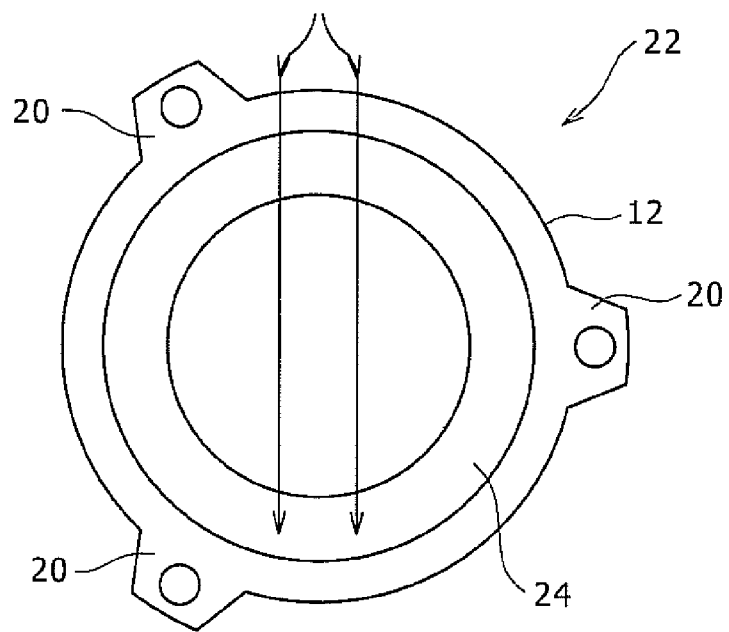
FIG. 11 is a side view of the stator shown in FIG. 10 viewed from the right side.

In contrast, when the projections projecting in the axial direction are not provided on the surfaces of the resin mold coil ends 24, as in the stator 22 conceived in the related art as shown in FIGS. 9 to 11, when the cooling oil is supplied from above the stator 22, the flow of the cooling oil down along the axial side surface of the resin mold coil end 24 is not restrained or impeded, such that tends to flow downward quickly in the direction of the gravitational force indicated FIG. 11 by arrows. Because the contact time between the cooling oil and the resin mold coil end 24 is shortened as a result improvement in the cooling performance of the motor is desired. In contrast, with the configuration of the first embodiment, these deficiencies are eliminated, and improvement of the cooling performance of the motor 28a is achieved.

According to the first embodiment, because the cooling oil flowing over the surfaces of resin mold coil ends 24a when the motor 28a is in operation tends to linger on the surfaces of the resin mold coil ends 24a by the plurality of column-shaped projections 54, the contact time between the cooling oil and the resin mold coil ends 24a may be increased, while the cooling oil readily flows over the entire surface of the resin mold coil ends 24a. Additionally, the heat exchange surface area between the cooling oil and the resin mold coil ends 24a may be increased. Therefore, effective improvement of the heat discharging properties of the coil end bodies 18 (see FIG. 8) which constitute the resin mold coil ends 24a is achieved. Furthermore, by integrally forming the plurality of column-shaped projections 54 with the resin mold coil ends 24a when resin-molding the coil end bodies 18, the effective improvement of the heat discharging properties of the coil end bodies 18 is achieved without excessive cost increases.

Second Embodiment

Figure 4:
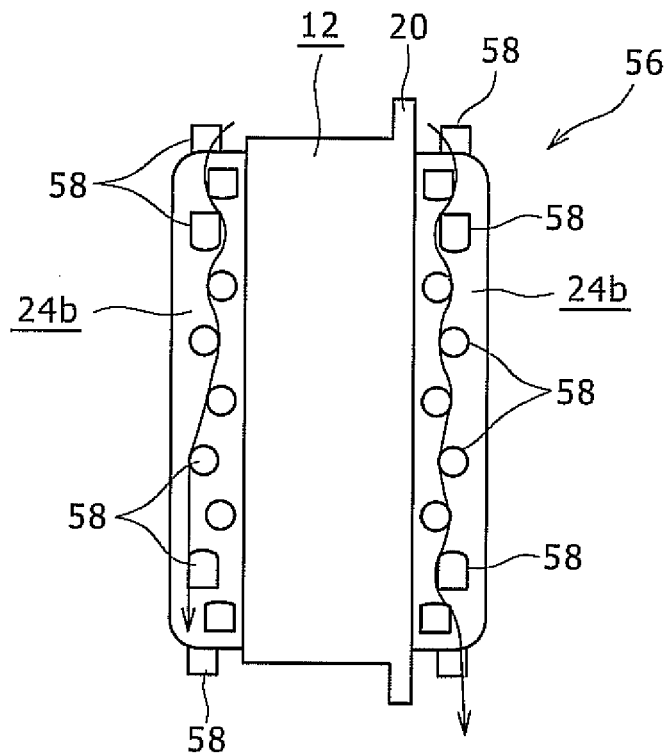
FIG. 4 is a schematic drawing showing a stator which constitutes a motor as a rotating electric machine according to a second embodiment of the present invention.
Figure 5:
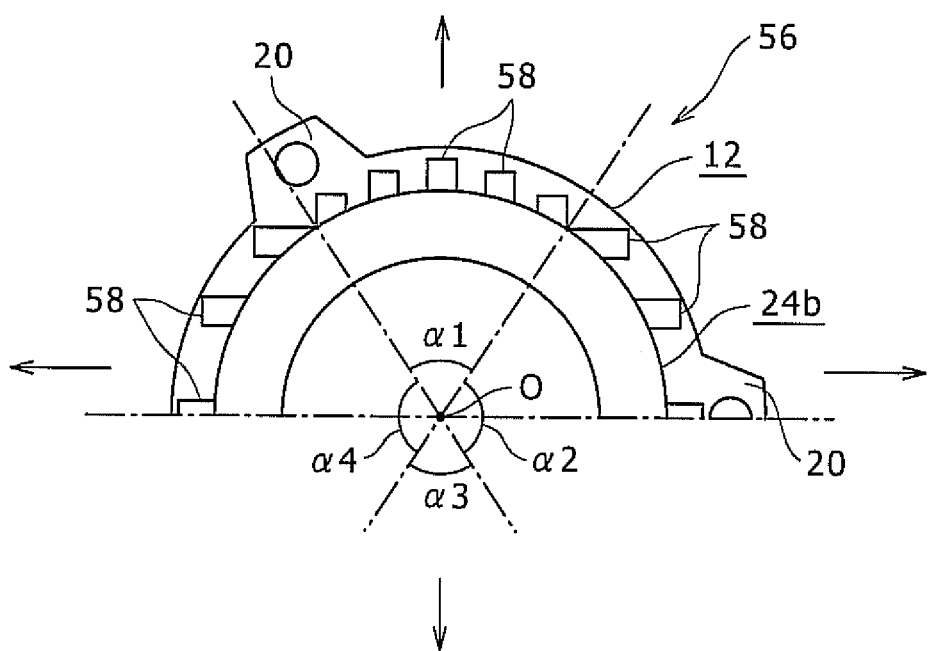
FIG. 5 is a drawing showing an upper half portion of the stator shown in FIG. 4 when viewed from the right side.

FIG. 4 is a schematic drawing showing a stator which constitutes a motor as an example of a rotating electric machine according to a second embodiment of the present invention. FIG. 5 is a drawing showing an upper half portion of the stator shown in FIG. 4 when viewed from the right side. In the second embodiment, column-shaped projections 58 of a shaft shape projecting in the radial direction or in a direction inclined with respect to the radial direction are provided on an outer peripheral surface of a resin mold coil end 24b which constitutes a stator 56 at a plurality of positions in the circumferential direction. The column-shaped projections 58 are provided also at positions on the respective resin mold coil ends 24b separated from each other along the radial axis.

All of the plurality of column-shaped projections 58 positioned within a certain angular range shown by an angle α1 in FIG. 5 with respect to an axial center O (see FIG. 5) of the resin mold coil end 24b are projected from the outer peripheral surface of the resin mold coil end 24b so as to be directed in the same direction (here, the vertical direction is exemplified). Therefore, the column-shaped projections 58 projecting in the radial direction of the outer peripheral surface and the column-shaped projections 58 projecting in the direction inclined with respect to the radial direction of the outer peripheral surface are mixed on a portion corresponding to the angle α1 of the outer peripheral surface of the resin mold coil end 24b. In the same manner, all of the plurality of column-shaped projections 58 positioned within the respective certain angular ranges shown by angles α2, α3, and α4 in FIG. 5 are projected from the outer peripheral surface of the resin mold coil end 24b so as to be directed in the same direction within the respective angular ranges.

When molding the resin mold coil end 24b which constitutes the stator 56, the resin mold coil end 24b may be molded using a partitioned die (not shown) divided into four parts corresponding to the respective angular ranges α1, α2, α3, and α4. The partitioned die divided into the four parts may form the resin mold coil end 24b having the plurality of column-shaped projections 58 positioned on the outer peripheral surface by dividing in the directions indicated by the arrows shown in FIG. 5.

With the configuration of the second embodiment, because the column-shaped projections 58 of the shaft shape are provided on the outer peripheral surfaces of the respective resin mold coil ends 24b at the plurality of positions in the circumferential direction, the cooling oil supplied to upper portions of the resin mold coil ends 24b and flowing downward along the surfaces of the outer peripheral surfaces of the resin mold coil ends 24b flows as shown by the arrows in FIG. 4, for example. In other words, by causing turbulence in the flow of the cooling oil by the column-shaped projections 58, the contact time of the cooling oil with the surface of each resin mold coil end 24b may be increased. Therefore, the plurality of column-shaped projections 58 are able to cause the cooling oil flowing downward on the surfaces of the resin mold coil ends 24b to linger thereon easily. Consequently, when the cooling oil flows down along the resin mold coil ends 24b, the flow of the cooling oil is diverted, such that the cooling oil is caused to flow over a sufficiently large surface area of the end surfaces of the resin mold coil ends 24b. Also, because the cooling oil flows through the gaps between the column-shaped projections 58, surface tension cause the cooling oil to be retained longer at the corresponding portions. Therefore, the contact time between the cooling oil and the resin mold coil ends 24b may be increased, such that the heat exchange performance between the cooling oil and the resin mold coil ends 24b is improved, such that the cooling performance of the motor 28a (see FIG. 3) is therefore also improved.

In this manner, according to the second embodiment, because the cooling oil is retained on the surfaces of the resin mold coil ends 24b by the plurality of column-shaped projections 58 when the cooling oil flows on the surfaces of the resin mold coil ends 24b when the motor 28a (see FIG. 3) is in operation, the contact time between the cooling oil and the resin mold coil ends 24a may be increased, so that effective improvement of the heat discharging properties of the coil end bodies 18 (see FIG. 8) which constitute the resin mold coil ends 24b can be achieved.

Because the plurality of column-shaped projections 58 include those projecting radially on the outer peripheral surfaces of the resin mold coil ends 24b at the plurality of positions in the circumferential direction and those projecting so as to be inclined in the radial direction with respect to the radial direction, even when the plurality of column-shaped projections 58 are integrally formed on the resin mold coil ends 24b at the time of resin-molding, the column-shaped projections 58 may be formed easily along the direction of die-cutting of the die used for the resin-molding, such that a structure which achieves the effective improvement of the heat discharging properties of the coils 16 (see FIG. 8) can be easily realized. As the configuration and effects are otherwise the same as in the first embodiment described above, equivalent portions are designated by the same reference numerals and their description will not be repeated.

Although not illustrated in the drawings, the first embodiment and the second embodiment may be combined. In other words, a configuration in which projections are provided on the axial end surfaces of the resin mold coil ends 24b at a plurality of positions and projections are provided on the radially outer peripheral surfaces of the resin mold coil ends 24b at a plurality of positions may also be employed.

Third Embodiment

Figure 6:
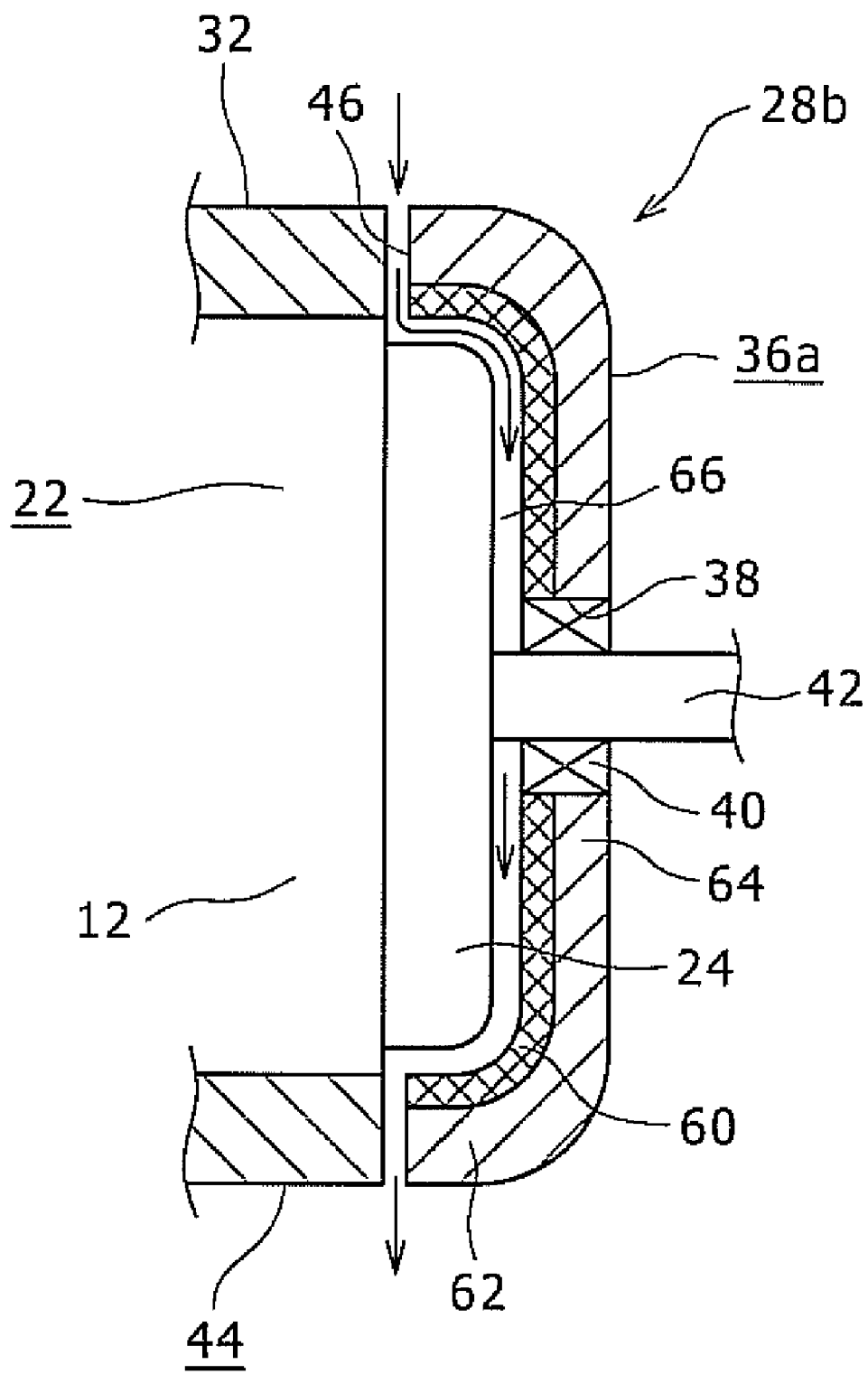
FIG. 6 is a partial cross-sectional view showing a motor as a rotating electric machine according to a third embodiment of the present invention.
Figure 7:
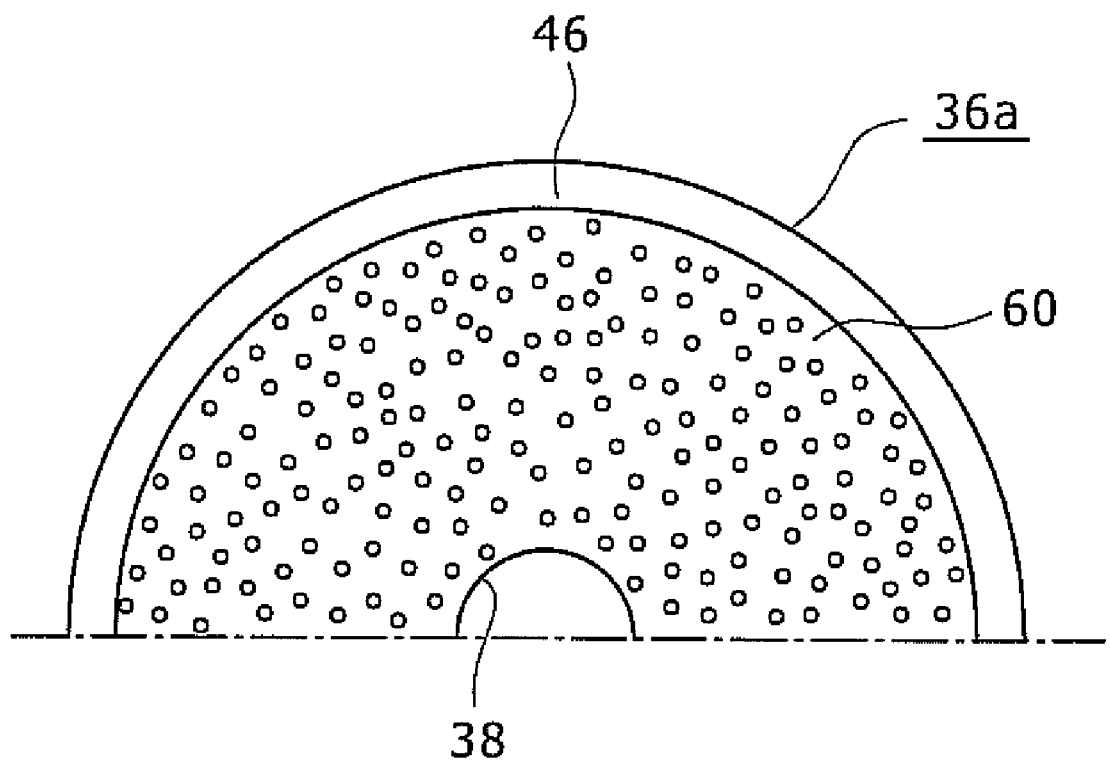
FIG. 7 is a drawing showing an upper half portion of a cover which constitutes the motor shown in FIG. 6 viewed in a state of being dismounted and viewed from the left side in FIG. 6.
Figure 12:
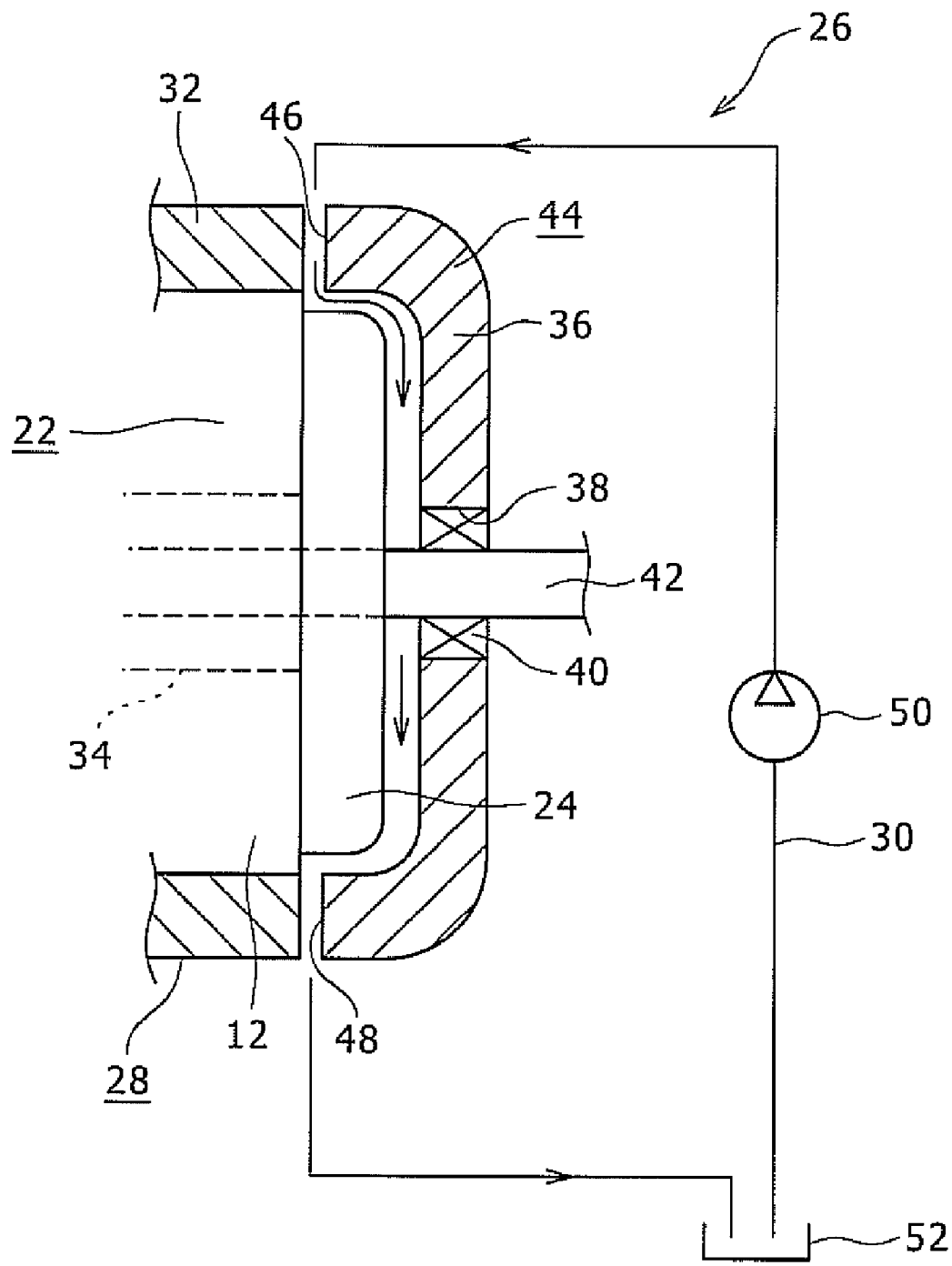
FIG. 12 is a schematic drawing showing an example of a cooling system for a rotating electric machine according to a related art.

FIG. 6 is a partial cross-sectional drawing showing a motor as an example of a rotating electric machine according to a third embodiment of the present invention. FIG. 7 is a drawing showing an upper half portion of a cover which constitutes the motor shown in FIG. 6 removed from its installation and viewed from the left side in FIG. 6. According to a motor 28b of the third embodiment, in a motor 28 as shown in FIG. 12 which includes the stator 22 conceived in the related art shown in FIGS. 9 to 11, an inner surface portion of a cover 36a which constitutes the motor case 44 opposing the resin mold coil end 24 as the stator coil end is formed of foamed metal 60 as a foamed portion formed from a metal such as aluminum. The foamed metal 60 is provided on an inner peripheral surface of a cylindrical portion 62 which constitutes the bottomed cover 36a and an entire inner surface portion of a bottom panel portion 64 which covers an end portion of the cylindrical portion 62. The cover 36a is provided so as to oppose the resin mold coil end 24 via a minute gap 66 for allowing the cooling oil to flow.

With the configuration according to this third embodiment, when the cooling oil flows through the gap 66 between the surface of the resin mold coil end 24 and an inner surface of the cover 36a as shown by arrows in FIG. 6, the cooling oil flows slowly over the inner surface of the cover 36a, such that the contact time between the cooling oil and the cover 36a is increased. Also, the contact time between the cooling oil and the cover 36a may also be increased by bringing the resin mold coil ends 24 and the cover 36a in proximity to each other so that the cooling oil can easily penetrates into the foamed metal 60 of the cover 36a. In addition, increase of the substantial surface area of the inner surface of the cover 36a is easily achieved by forming the foamed metal 60, so that the heat exchange surface area between the cooling oil and the cover 36a may be increased. Therefore, effective improvement of the heat discharging properties of the coil end bodies 18 (see FIG. 8) which constitute the resin mold coil ends 24a can be achieved.

Also, because the cover 36a is configured as part of the motor case 44 which fixes the stator 22 inside thereof and covers the same, a specific component only for cooling the motor 28b is not required so that large increase of costs is not brought. Therefore, effective improvement of the heat discharging properties of the coil end bodies 18 (see FIG. 8) is achieved. In contrast, in the motor 28 according to the related art shown in FIG. 12 in which the foamed portion is not provided on an inner surface of a cover 36, the cooling oil does not remain on the cover 36 but tends to quickly flow downward through the gap between the inner surface of the cover 36 and the resin mold coil end 24, and improvement of the heat discharging properties of the coil end body 18 is therefore required. Especially, the improvement is required in configurations in which the amount of cooling oil is small, as thermal shrinkage of the coil end body 18 tends to be small. When the configuration according to the third embodiment is employed, such inconveniences may be eliminated.

In the third embodiment, because portions of the covers 36a including the inner surfaces opposing the resin mold coil ends 24a are formed of the foamed metal, the strength of the covers 36a is also effectively ensured.

Because the stator coil end is the resin mold coil end 24 including the coil end body 18 (see FIG. 8) configured by the axial end portions of the coils 16 (see FIG. 8) which constitute the stator 22 and the resin which embeds the coil end body 18, the heat discharging property of the entire coil end body 18 when the coil end body 18 is cooled by cooling oil or the like can be improved. As the configuration and effects are otherwise the same as with the structure according to the related art shown in FIGS. 8 to 12 or those of the first embodiment shown in FIGS. 1 to 3 described above, equivalent portions are designated by the same reference numerals and their description will not be repeated.

The effective improvement of the heat discharging property of the coil end body 18 is achieved by providing the foamed portion on the inner surface of the cover 36a which opposes the coil end body 18 as in the third embodiment, even in the case of another structure such that the coil end body 18 (see FIG. 8) is solidified by varnish or the like instead of resin-molding.

In the respective embodiments described above, the coils 16 (see FIG. 8) which constitute the stators 22, 22a are not limited those wound on the teeth 14 of the stator core 12 as shown in FIG. 8 in the concentrated winding manner, but may be wound on the teeth 14 in the distributed winding manner or the like.

Although the present invention has been described above referring to examples and with reference to the accompanying drawings, it is to be noted that various changes and modifications will be apparent to those skilled in the art. Therefore, unless such changes and modifications depart from the spirit and the scope of the present invention, they should be construed as being included therein.

What is claimed is:

1. A rotating electric machine comprising:
 a rotor; and
 a stator having a stator coil end, the stator coil end allowing flow of a cooling oil on a surface thereof during operation, wherein
 the stator coil end is a resin mold coil end including a coil end body formed of axial end portions of coils which constitute the stator and resin which embeds the coil end body,
 the resin mold coil end includes a plurality of column-shaped projections provided on the surface thereof, and
 the plurality of projections project along the axial direction from locations distanced in the radial direction of an axial outer side surface of the resin mold coil end at a plurality of positions along the circumferential direction.

2. A cooling system for a rotating electric machine comprising:
 the rotating electric machine according to claim 1; and
 a cooling oil supply portion configured to supply the cooling oil to the rotating electric machine.

3. A rotating electric machine comprising:
 a rotor; and
 a stator having a stator coil end, the stator coil end allowing flow of a cooling oil on a surface thereof during operation, wherein
 the stator coil end is a resin mold coil end including a coil end body formed of axial end portions of coils which constitute the stator and resin which embeds the coil end body,
 the resin mold coil end includes a plurality of column-shaped projections provided on the surface thereof, and
 the plurality of projections project along the radial direction or in a direction inclined with respect to the radial direction from locations distanced in the axial direction of an outer peripheral surface of the resin mold coil end at a plurality of positions along the circumferential direction.

4. A cooling system for a rotating electric machine comprising:
 the rotating electric machine according to claim 3; and
 a cooling oil supply portion configured to supply the cooling oil to the rotating electric machine.

* * * * *